US012125328B2

(12) United States Patent
Fisher et al.

(10) Patent No.: US 12,125,328 B2
(45) Date of Patent: Oct. 22, 2024

(54) ELECTRONIC LOCKBOX WITH EMBEDDED INSERT

(71) Applicant: SentriLock, LLC, Cincinnati, OH (US)

(72) Inventors: Scott R Fisher, West Chester, OH (US); Matthew K Caskey, Loveland, OH (US); Jeffrey W Stone, Lebanon, OH (US)

(73) Assignee: SentriLock, LLC, Cincinnati, OH (US)

(*) Notice: Subject to any disclaimer, the term of this patent is extended or adjusted under 35 U.S.C. 154(b) by 337 days.

(21) Appl. No.: 17/680,922

(22) Filed: Feb. 25, 2022

(65) Prior Publication Data

US 2022/0284751 A1 Sep. 8, 2022

Related U.S. Application Data

(60) Provisional application No. 63/155,892, filed on Mar. 3, 2021.

(51) Int. Cl.

| | |
|---|---|
| ***G07C 9/00*** | (2020.01) |
| ***E05B 15/16*** | (2006.01) |
| ***E05B 19/00*** | (2006.01) |
| ***E05B 67/22*** | (2006.01) |
| ***E05B 67/38*** | (2006.01) |
| ***E05G 1/00*** | (2006.01) |

(52) U.S. Cl.
CPC ...... *G07C 9/00896* (2013.01); *E05B 15/1614* (2013.01); *E05B 19/0005* (2013.01); *E05B 67/22* (2013.01); *E05G 1/005* (2013.01); *E05B 67/38* (2013.01)

(58) Field of Classification Search
CPC ............. E05B 15/1614; E05B 19/0005; E05B 65/5246; E05B 67/02; E05B 67/04; E05B 67/22; E05B 67/38; E05G 1/04; E05G 1/10; G07C 9/00896; G07C 9/00936
See application file for complete search history.

(56) References Cited

U.S. PATENT DOCUMENTS

| | | | | |
|---|---|---|---|---|
| 3,807,970 A | 4/1974 | Greene | | |
| 4,608,318 A | 8/1986 | Makrides | | |
| 4,609,780 A | 9/1986 | Clark | | |
| 4,649,723 A | 3/1987 | Appelbaum | | |
| 5,280,518 A | 1/1994 | Panler | | |
| 6,526,786 B1 | 3/2003 | Kayoda | | |
| 6,727,801 B1 * | 4/2004 | Gervasi | G08B 15/02 | 340/5.3 |

(Continued)

OTHER PUBLICATIONS

International Search Report, PCT/US22/17879; 13 pages (Jul. 7, 2022).

*Primary Examiner* — Christine M Mills
*Assistant Examiner* — Faria F Ahmad
(74) *Attorney, Agent, or Firm* — Frederick H. Gribbell; Russell F. Gribbell; William E. Crouse

(57) ABSTRACT

An electronic lockbox including a key bin having an embedded insert. The insert is embedded during a die cast process. The insert enhances the attack resistance of the lockbox from hammering, chiseling, and drilling attacks. The insert includes "3D features" that help with the casting process and attack resistance, including at least one through-hole, at least one slot, and at least one ridge. A housing portion is constructed over multiple drawing stages to increase its hardness and strength, thereby increasing resistance to prying attacks.

20 Claims, 16 Drawing Sheets

(56) References Cited

U.S. PATENT DOCUMENTS

| | | | | |
|---|---|---|---|---|
| 6,813,912 | B1 * | 11/2004 | Ng | E05B 19/0005 70/284 |
| 7,666,353 | B2 | 2/2010 | Donahue | |
| 8,499,594 | B2 | 8/2013 | Misner | |
| 8,850,858 | B2 * | 10/2014 | Nave | E05B 47/06 70/279.1 |
| 9,464,462 | B1 * | 10/2016 | Liu | E05B 67/02 |
| 11,017,625 | B2 | 5/2021 | Ou et al. | |
| 2010/0192641 | A1 * | 8/2010 | Nave | E05B 67/22 70/284 |
| 2012/0174637 | A1 | 7/2012 | Larson | |
| 2012/0186308 | A1 * | 7/2012 | Garthe | E05B 67/02 70/20 |
| 2015/0322692 | A1 * | 11/2015 | Lai | E05B 37/14 70/21 |
| 2016/0002958 | A1 * | 1/2016 | Liu | E05B 15/0053 70/52 |
| 2020/0248481 | A1 * | 8/2020 | Melkovitz | E05B 63/22 |
| 2023/0100697 | A1 * | 3/2023 | Gopavaram | E05B 47/0002 70/277 |
| 2023/0366238 | A1 * | 11/2023 | Mao | G07C 9/00309 |
| 2024/0044178 | A1 * | 2/2024 | Fan | E05B 67/22 |

* cited by examiner

ELECTRONIC LOCKBOX WITH EMBEDDED INSERT

CROSS-REFERENCE TO RELATED APPLICATIONS

The present application claims priority to provisional patent application Ser. No. 63/155,892, titled "ELECTRONIC LOCKBOX WITH EMBEDDED INSERT," filed on Mar. 3, 2021.

TECHNICAL FIELD

The technology disclosed herein relates generally to electronic locking equipment and is particularly directed to an electronic lockbox of the type which has a releasable key bin with an embedded insert in its bottom wall or floor, thereby increasing attack resistance. Embodiments are specifically disclosed as an electronic lockbox having a housing and a releasable key bin, the housing having been constructed over multiple drawing stages thereby exhibiting increased resistance to prying attacks, and the key bin having been die cast over an insert thereby exhibiting increased resistance to hammering, chiseling, and drilling attacks.

Security products require as much physical protection as possible against attack. This must be balanced by available materials and cost. Many consumer grade electronic lockboxes rely upon the use of die cast parts, as they can be formed into complex shapes and are low in cost to produce in high volumes. Typical die cast parts, unfortunately, offer little resistance to drill attacks.

One solution to the poor drill resistance is to attach heat treated steel plates (i.e., inserts) in strategic areas, which will increase attack resistance and slow any physical attacks. The steel plate preferably will have a hardness of at least Rockwell "C" of 50, for example; otherwise commonly available cobalt drill bits can easily penetrate the material.

Such a hardened steel plate could be attached to an inner surface of the key bin, or the plate could be embedded in a portion of the key bin. Embedding the plate eliminates the problems associated with fastening but introduces several new difficulties in manufacturing. First, the high temperature of the die cast alloy can often exceed the annealing temperature of the steel insert. Second, the geometry of the steel insert can interfere with the flow of the liquefied casting alloy causing voids or introducing porosity in the finished cast part. Also, if the casting alloy includes silicon, it will have inherent brittleness due to the grain structure in the finished parts. The casting walls surrounding the steel insert may break away with impacts from a hammer and chisel, exposing the steel plate and potentially allowing its removal unless steps are taken to prevent this possibility.

With regard to the key bin, aluminum die cast alloys are preferred over zinc alloys due to their lower weight and, more importantly, they do not suffer from a high ductile to brittle transition temperature.

However, using aluminum casting alloys create another problem. The high melting temperature (over 1100 degrees Fahrenheit) of the aluminum alloys will anneal the steel insert, rendering it too soft to stop a drill from penetrating it. To solve the annealing problem, the specific heat and mass of both the die cast aluminum part and the steel insert and their geometries have to be measured to ensure the cooling rate of the casting, combined with the specific heat of the steel insert, to ensure the temperature of the steel does not rise to its annealing point. The geometry of the steel part must also be considered, as the localized heating rate will increase for narrower and cut-out sections versus a larger unbroken central mass.

Die casting minimum wall thickness limitations and mold flow considerations require careful tooling design to ensure the inserted steel plate does not cause mold flow turbulence during casting, and therefore create voids in the casting which will be detrimental to the strength of the components. Minimum wall thickness limitations surrounding the steel insert require a geometry that includes features to lock the steel plate into the casting in more than two dimensions (i.e., preferably using "3D features").

During physical attack, the interface of the casting and steel plate will be broken away more easily with an external attack (such as with a hammer and chisel) as the casting material will more easily fracture. In that event, this will expose the steel plate inside the casting. The addition of tab features with openings allow the molten casting material to flow through parts of the steel plate and make it more difficult to be separated from the casting. The tab features being smaller result in a localized area and mass of the insert that will somewhat anneal during the casting process. This is desirable, if limited, as it will make the steel more ductile in those areas and less vulnerable to cracking or fracturing on impacts. These features are preferably limited to the periphery of the steel plate to preserve central drill resistance.

Lockbox housings can also be made from steel which is mechanically drawn in stages through the use of a series of dies attached to hydraulic presses. The type of steel used to form the lockbox housing preferably is nearly free of elemental carbon as the drawing process would otherwise cause the steel to crack. Low carbon steels cannot be heat treated for strength and therefore remain ductile and susceptible to drill attacks.

Regarding the drawn housing component, the process involved in improving the hardness of the housing to resist drill attacks and provide maximum pry resistance for any exposed edges is important to achieve the desired functional results and attack resistance. Low carbon steels designed for the drawing process are insufficient to achieve these results as they cannot be heat treated to achieve higher hardness. In place of low carbon steel, it is desirable to use nickel stainless steel. Nickel based stainless steels become strain hardened during the drawing process; in other words, the steel is plastically deformed thus producing a tougher material that resists additional deformation. They also resist drilling due to localized work hardening where the drill bit contacts the material. Multiple draw stages are needed to achieve the final net shape but also, as importantly, the desired hardness. Nickel stainless steels are extremely ductile in their annealed state and can be pried easily with hand tools. Therefore, the drawing stages should be designed to arrive at an end hardness of at least Rockwell "C" 38, for example, at the opening to limit the effects of prying on the material attempting to defeat the lockbox secure container.

STATEMENT REGARDING FEDERALLY SPONSORED RESEARCH OR DEVELOPMENT

None.

BACKGROUND

Electronic lockboxes typically have ratings for how difficult (or easy) they are to break into. The key bin is one point that is particularly attacked, because it is designed to be opened. An attacker normally drills, chisels, or hammers the key bin in an attempt to open it.

For lockboxes that have a drop-down key bin, the bottom of the key bin (i.e., the bottom of the lockbox) is especially vulnerable to attack. To secure the base to the key bin, it is typical to use fasteners. However, fasteners are easily exploited by an attacker. The base also needs to align properly with the housing, or an attacker could pry the key bin open.

The secure container itself is another possible point of attack because it contains the building key. An attacker may attempt to drill, chisel, or hammer that portion of the lockbox housing.

SUMMARY

Accordingly, it is an advantage to provide an electronic lockbox with a key bin having an embedded insert, in which the key bin exhibits increased resistance to hammering, chiseling, and drilling attacks.

It is another advantage to provide an electronic lockbox with a housing constructed over multiple draws, thereby increasing its resistance to prying attacks.

It is yet another advantage to provide an insert for an electronic lockbox releasable key bin, the insert having a plurality of through-holes and slots, the insert exhibiting at least one angled end portion (or tab), the insert having at least one ridge, in which these features allow the insert to be placed on locating pins of a die as the key bin is cast around the insert, thereby increasing the attack resistance of the key bin.

It is still another advantage to provide an insert for an electronic lockbox releasable key bin, the insert having a minimal thickness to prevent complete annealing of the entire insert during a die casting procedure.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an electronic lockbox is provided, which comprises: (a) a housing that covers an electronically-controlled lock; and (b) a closable secure container that includes a base portion; wherein: (i) the base portion including an embedded steel plate, the steel plate exhibiting a material thickness of at least 0.0762 cm (0.03 inches); and (ii) the secure container is lockable if inserted into the housing, and the secure container is at least partially removable if unlocked.

In accordance with another aspect, an electronic lockbox is provided, which comprises: (a) a housing that covers an electronically-controlled lock; and (b) a closable secure container including a base portion; wherein: (i) the base portion including an embedded steel plate, the steel plate being hardened by heat treatment, and exhibiting a material hardness of between 52 and 58 on the Rockwell “C” scale; and (ii) the secure container is lockable if inserted into the housing, and the secure container is at least partially removable if unlocked.

In accordance with yet another aspect, an electronic lockbox is provided, which comprises: (a) an outer housing; and (b) a closable secure container made from a metal alloy using a die casting process, the secure container including an embedded heat treated steel plate, the steel plate including at least one opening proximal to a perimeter of the steel plate such that molten metal alloy flows through the at least one opening during the die casting process.

In accordance with still another aspect, an electronic lockbox is provided, which comprises: (a) an outer housing; and (b) a closable secure container made from a metal alloy using a die casting process, the secure container including an embedded heat treated steel plate; wherein: (i) the steel plate exhibiting at least one inclined tab proximal to the perimeter of the steel plate, and the at least one inclined tab includes at least one opening; and (ii) a material of the at least one inclined tab is partially annealed in only a localized manner during the die casting process.

In accordance with a further aspect, a housing for an electronic lockbox is provided, the housing comprising: (a) an outer housing constructed of a solid material including an open bottom portion; (b) a releasable secure container, the secure container being lockable if positioned inside the housing, and being releasable when unlocked; and (c) the secure container exhibiting a base portion which includes an embedded insert.

In accordance with a yet further aspect, an insert embedded in a movable portion of an electronic lockbox is provided, the insert comprising: (a) a substantially planar configuration exhibiting a first side, a second side and a perimeter; (b) at least one ridge running along the second side; (c) at least one through-hole between the first side and the second side; (d) at least one slot at the perimeter; (e) at least one inclined tab proximal to the perimeter; and (f) the insert is constructed of an attack resistant material; wherein: during a die casting process, the at least one through-hole, the at least one slot, and the at least one inclined tab permit the insert to be securely mounted in a mold cavity of a die, and as molten die casting alloy is introduced, the alloy is permitted to flow around and through the insert to allow the insert to securely embed into the die casting alloy as the alloy solidifies.

In accordance with a still further aspect, an electronic lockbox with increased attack resistance is provided, which comprises: (a) an outer housing; (b) a secure container, the secure container being both releasable and insertable into the outer housing; and (c) the secure container including a base portion that contains a hardened insert, the insert exhibiting at least one through-hole, and the insert being embedded within a wall of the secure container during a die casting process.

In accordance with yet another aspect, an electronic lockbox is provided, which comprises: (a) a housing; (b) a secure container, the secure container is movable with respect to the housing to allow an authorized user access to its contents; (c) an insert, the insert is substantially planar with a perimeter, the insert exhibiting at least one inclined tab proximal to the perimeter, the insert exhibiting a plurality of openings, the insert exhibiting at least one ridge or channel running along its surface; the insert exhibiting at least one slot proximal to the perimeter; and (d) the insert is embedded in a wall portion of the secure container during a die casting process.

In accordance with still another aspect, a method for constructing an electronic lockbox with increased attack resistance is provided, the method comprising the steps of: (a) providing a housing; (b) providing an insertable and releasable secure container; and (c) providing an insert plate; wherein the insert plate is embedded within a wall portion of the closeable secure container by: (d) providing at least one indentation in the insert plate; (e) providing a mold cavity exhibiting at least one locating pin; (f) mounting the insert plate to the mold cavity, by aligning the at least one indentation with the at least one locating pin; (g) casting the secure container by forcing molten alloy material into the mold cavity and over the insert plate, thereby embedding the insert plate inside a wall portion of the secure container; and (h) mounting the secure container to the housing.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

FIG. 3 is a bottom view of an insert to be embedded within the lockbox of

FIG. 1.

DETAILED DESCRIPTION

Figure 1:
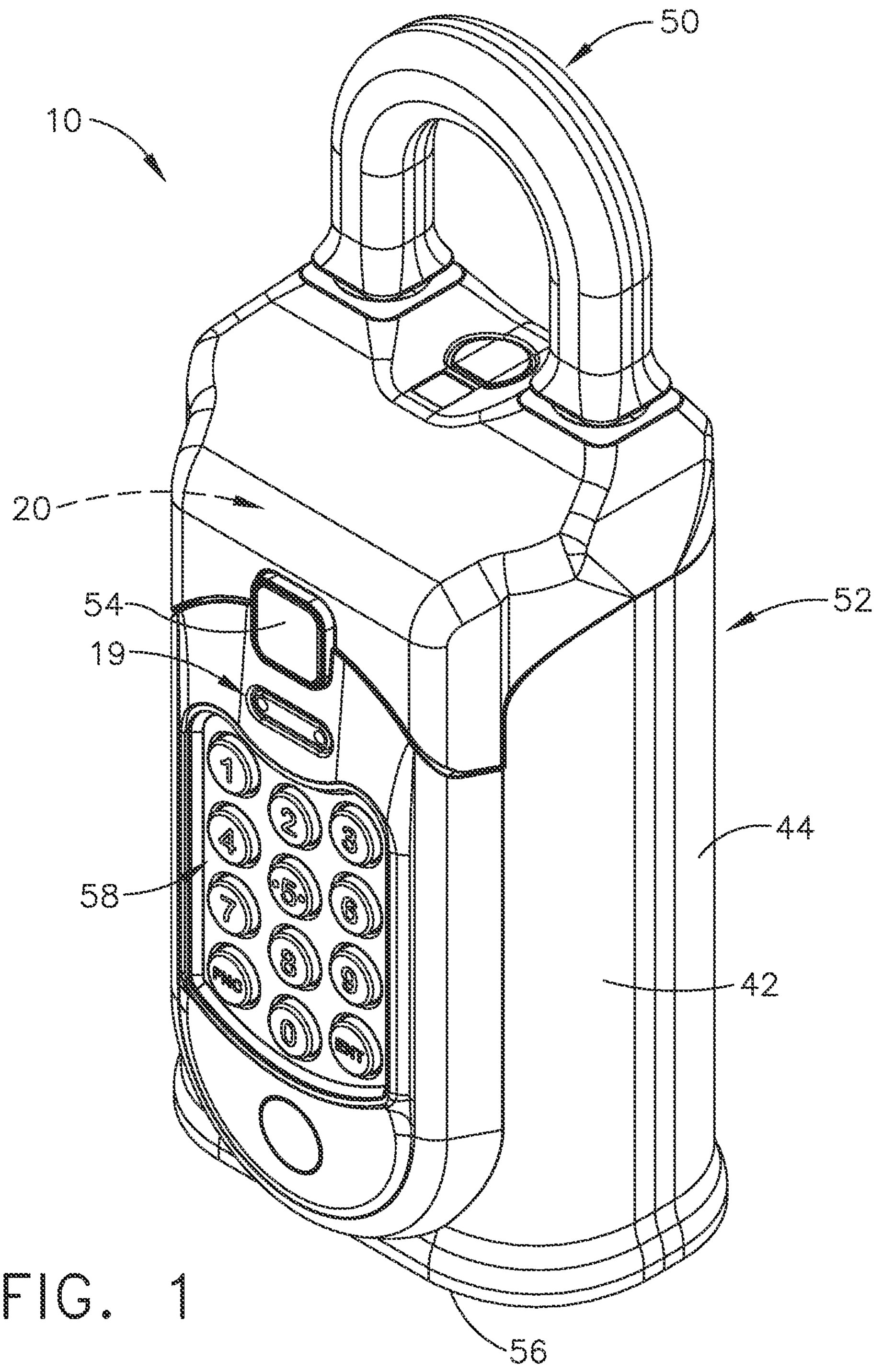
FIG. 1 is a front, top-down perspective view of the entire lockbox as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless limited otherwise, the terms “connected,” “coupled,” or “mounted,” and variations thereof herein are used broadly and encompass direct and indirect connections, couplings, or mountings. In addition, the terms “connected” or “coupled” and variations thereof are not restricted to physical or mechanical connections or couplings.

The terms “first” or “second” preceding an element name, e.g., first inlet, second inlet, etc., are used for identification purposes to distinguish between similar or related elements, results or concepts, and are not intended to necessarily imply order, nor are the terms “first” or “second” intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

Referring now to FIG. 1, an exemplary embodiment of an electronic lockbox is generally designated by the reference numeral 10. The lockbox has an outer housing (or enclosure or casing) 52, a shackle 50, and showing a bottom wall structural portion 56 of a movable key bin 40 (this item 56 is also referred to herein as a “base,” a “base portion,” a “floor portion,” or a “wall”) which is located proximal to the bottom portion of the casing 52. The upper housing of lockbox 10 includes two receptacles (openings) that receive a shackle 50. The shackle 50 has an upper portion and two shackle extensions 66, 68 (see FIG. 2) that fit through the receptacles. The front of the lockbox has a keypad 58, which can be used by a sales agent or other authorized person to enter data to the lockbox’s control system. Above the keypad is an indicator LED lamp 19, which will indicate various status states of the lockbox during its operations, and a label, or display, 54.

Behind the keypad 58, and internal to the housing 52, is a “locking mechanism” (or electronically-controlled “lock”) 20. The lock 20 secures both the shackle extension 66 and a secure container 40 (see FIG. 2). This type of lock is disclosed in detail in Published Application No. US 2020/

0308870, commonly owned by SentriLock, LLC, and incorporated by reference herein. In other words, the lockbox 10 has the ability to be "locked" or "unlocked" according to user action and under control of the electronic controller (at least for the unlocking action). As disclosed in detail in the above patent application, the mechanical design allows the lockbox to be "locked" without further action of the electronic controller, when a user fully inserts the movable key bin back into the main body of the lockbox, although other mechanical designs are certainly possible to meet the criterion of being able to lock (or "close") and unlock (or "release") the key bin.

The keypad 58 may also be referred to as a "data input circuit," in which a human user may press one or more of the keys to enter data, such as numeric information. It will be understood that future versions of electronic lockboxes may someday include a touchscreen display, and in such a design, the keypad will be incorporated directly into that display, and thus the touchscreen display itself would become the data input circuit.

As noted above, electronic lockbox 10 includes a shackle 50 that is typically used to attach the lockbox 10 to a door handle or other fixed object. Electronic lockbox 10 also includes a secure key compartment 64 which typically holds a building key (not shown), and which can be accessed via the releasable key bin (or "secure container") 40 (which also can be referred to as a "movable portion" of the electronic lockbox). The electronic lockbox 10 has a front housing portion 42 and a rear housing portion 44.

Figure 2:
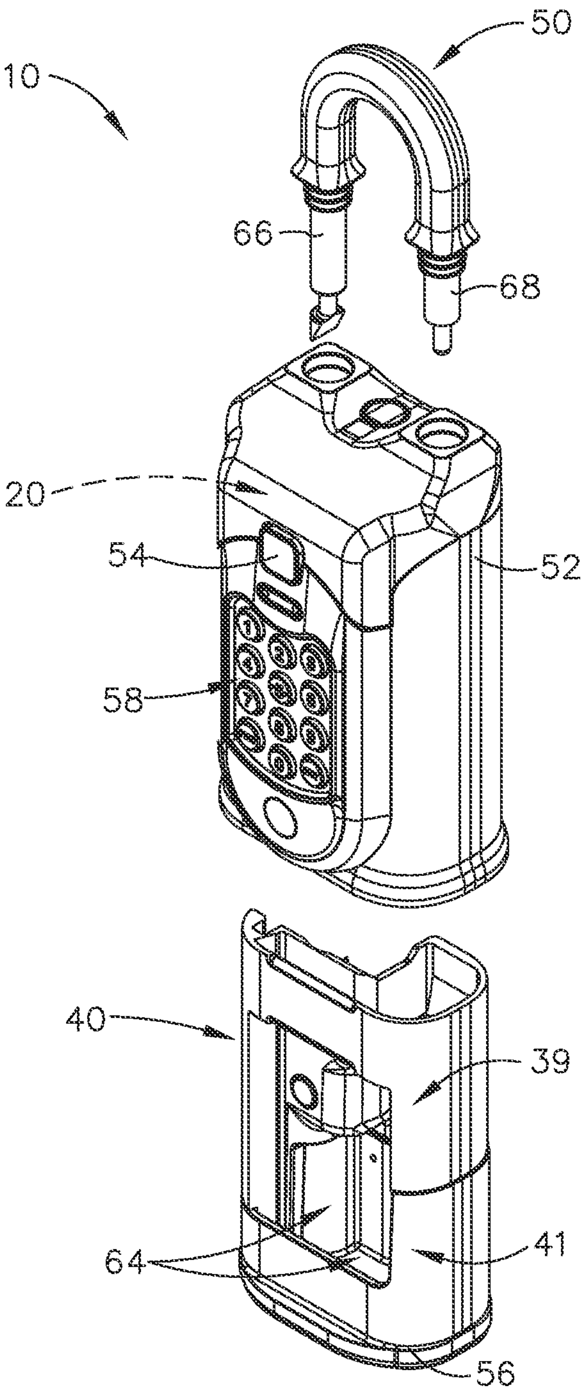
FIG. 2 is a front, top-down perspective view of the lockbox of FIG. 1, showing the shackle and key bin detached.

Referring now to FIG. 2, the electronic lockbox 10 is shown with the shackle 50 released, and the key bin 40 detached. It should be noted that key bin 40 is unable to completely detach as illustrated; however, the key bin (i.e., the "secure container") 40 is at least partially removable from the housing 52. The lockbox 10 can be locked or unlocked and, once unlocked, the releasable secure container 40 can "fall out" of the electronic lockbox 10 only a certain distance so that a user can access the key compartment 64. When done, the user can "push up" (insert) the closeable secure container 40 back into the electronic lockbox 10 so that it locks back in place. The key bin 40 includes an upper portion (or top half) 39, a lower portion or (bottom half) 41, and the base portion 56. Note that the key bin 40 is both "releasable" and "closable" by virtue of its ability to become an integral part of the lockbox when it is inserted into the main body of the lockbox (i.e., it "closes" into the lockbox), and later to come at least partially loose from the lockbox main body when it is released, so that access to the secure compartment 64 becomes possible.

Figure 3:
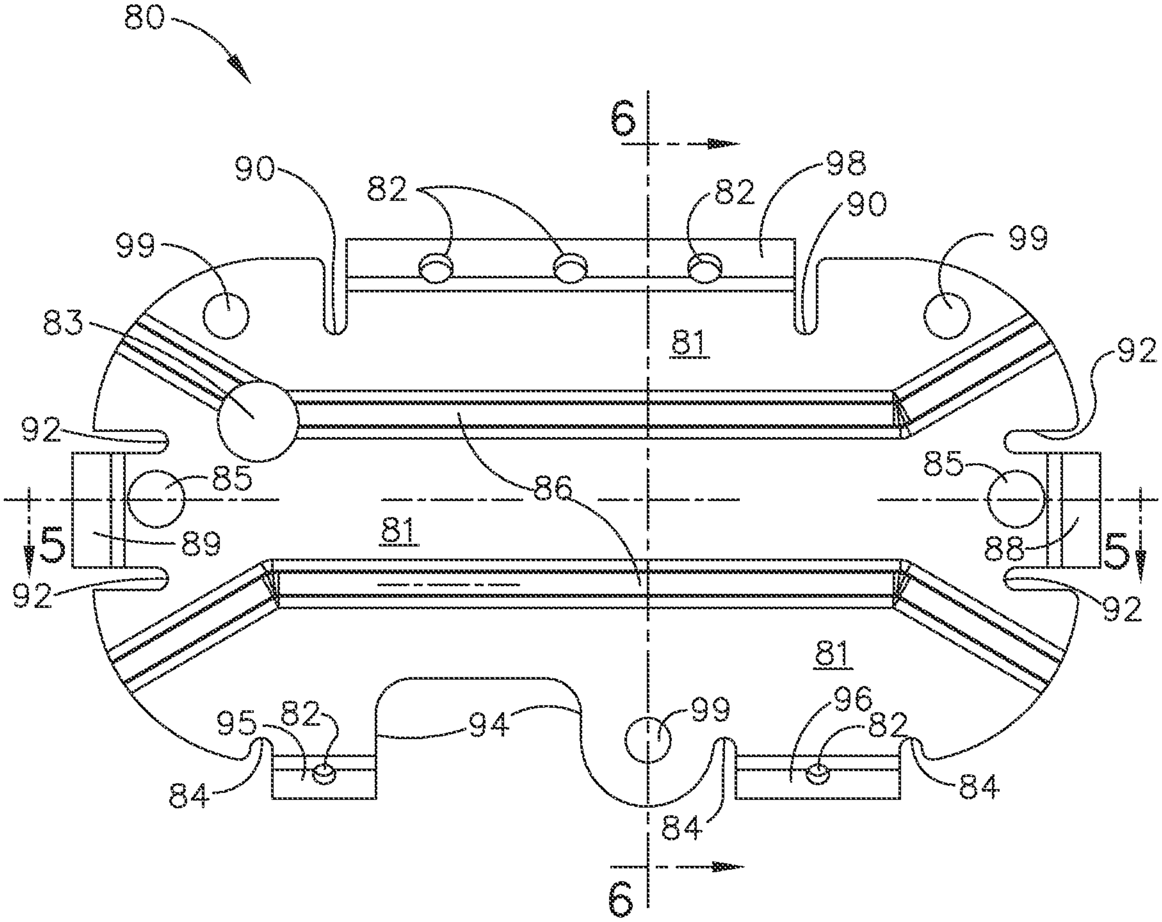

Referring now to FIG. 3, a bottom view of an insert 80 is shown. This insert 80 is to be embedded in the base 56 of the secure container 40 during a die cast process (see FIGS. 11-13). The insert 80 has a planar portion 81 having outer edges (a perimeter). The planar portion 81 exhibits a plurality of ridges 86, and a plurality of inclined tabs or raised edges 88, 89, 95, 96, 98. The inclined tabs 88, 89, 95, 96, 98 are located at the outer edges of the insert 80. The inclined tabs 88, 89 are located along the transverse edges, and the inclined tabs 95, 96, 98 are along the longitudinal edges. It should also be noted that the inclined tabs are of varying sizes; inclined tabs 88, 89 and 95, 96 are smaller than the single large inclined tab 98, and inclined tab 95 is smaller than inclined tab 96.

Proximal to the inclined tab 95 is an opening or gap 94 along the longitudinal edge, and a through-hole 99. The insert 80 exhibits a plurality of through-holes 99, and their functionality will be described in further detail below. Proximal to the inclined tabs 96 are a plurality of small slots along the longitudinal edge 84. These small slots 84 are located along both sides of the inclined tabs 95, 96 along the bottom longitudinal edge (in this view), and the opening 94 acts as a large slot or gap where it meets the inclined tab 95. The inclined tabs 95, 96 exhibit a small through-hole 82 in each inclined tab.

The inclined tabs 88, 89 exhibit a plurality of large slots 92 along the transverse edges, and these large slots 92 are located along both sides of the inclined tabs 88, 89. Proximal to the inclined tabs 88, 89 are a plurality of through-holes 85 on the planar portion 81 of the insert 80. These through-holes 85 will be discussed in further detail below.

The single large inclined tab 98 exhibits a plurality of small through-holes 82, and on each side of the inclined tab 98 are large slots 90 along the upper longitudinal edge (in this view). The planar portion 81 exhibits two through-holes 99 near the outermost longitudinal edge proximal to each large slot 90. The planar portion 81 also exhibits a single large through-hole 83 near the left transverse edge (in this view).

Figure 4:
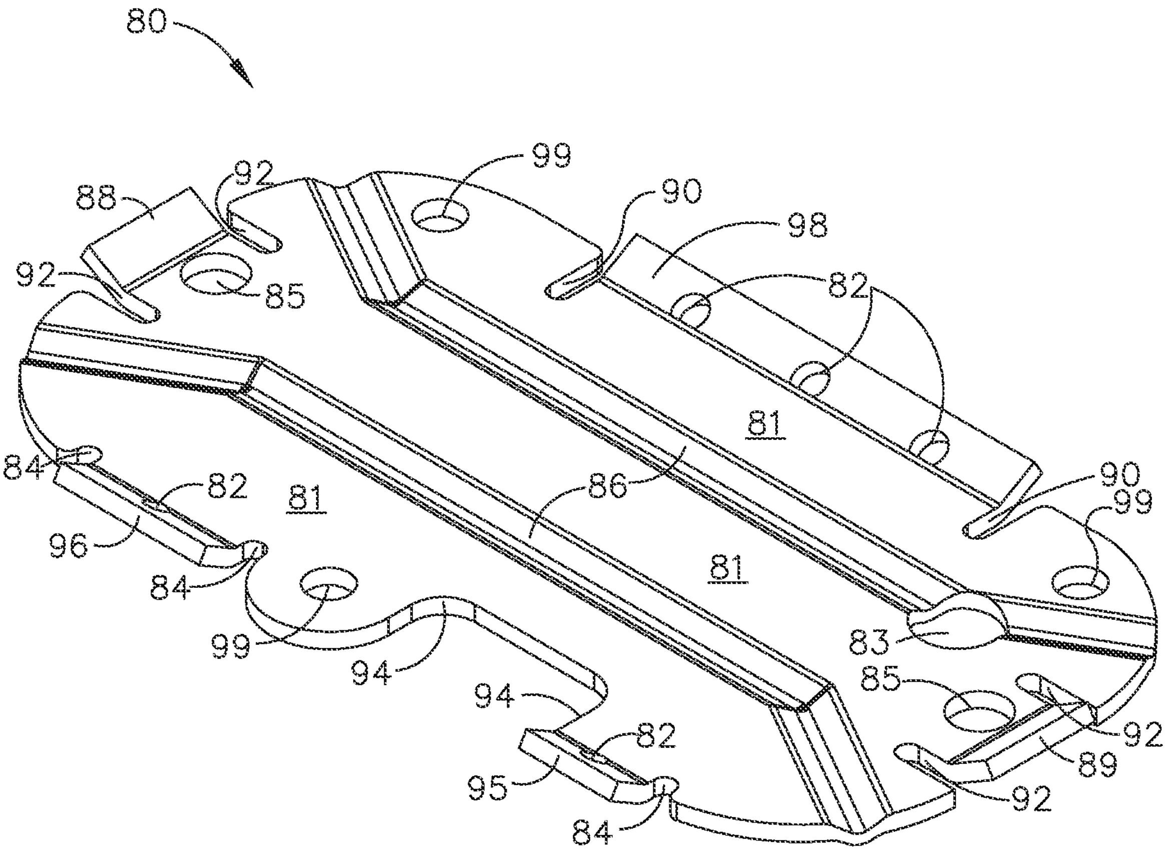
FIG. 4 is a front, top-down perspective view of the insert of FIG. 3.

Referring now to FIG. 4, a front, top-down perspective view of the insert 80 is shown. Note that the ridges 86 appear as "channels" in this view, due to the orientation of the insert 80 as illustrated. The inclined tabs 88, 89, 95, 96, 98 are shown projecting at an inclined angle from the insert 80 in an "upward" orientation. Of course, it would be possible to design the inclined tabs to project at various angles, "upwards" or "downwards," as long as they achieve the desired effect (i.e., increasing attack resistance of the lockbox).

The inclined tabs 88, 89, 95, 96, 98 are one "3D feature" used here to better secure the insert 80 to the key bin floor 56 during the die casting process, thereby improving the attack resistance by making it more difficult to break through or around the insert. The inclined tabs 88, 89, 95, 96, 98 tend to prevent complete annealing of the insert 80 during the die casting process. Another "3D feature," the small holes 82, through-holes 85, and large through-hole 83, allow the molten alloy material to flow through and around the insert during the die cast process. A third "3D feature," the small slots 84, large slots 90, and large slots 92, also allow the molten alloy material to flow through and around the insert during the die cast process, similar to the plurality of through-holes.

Figure 5:
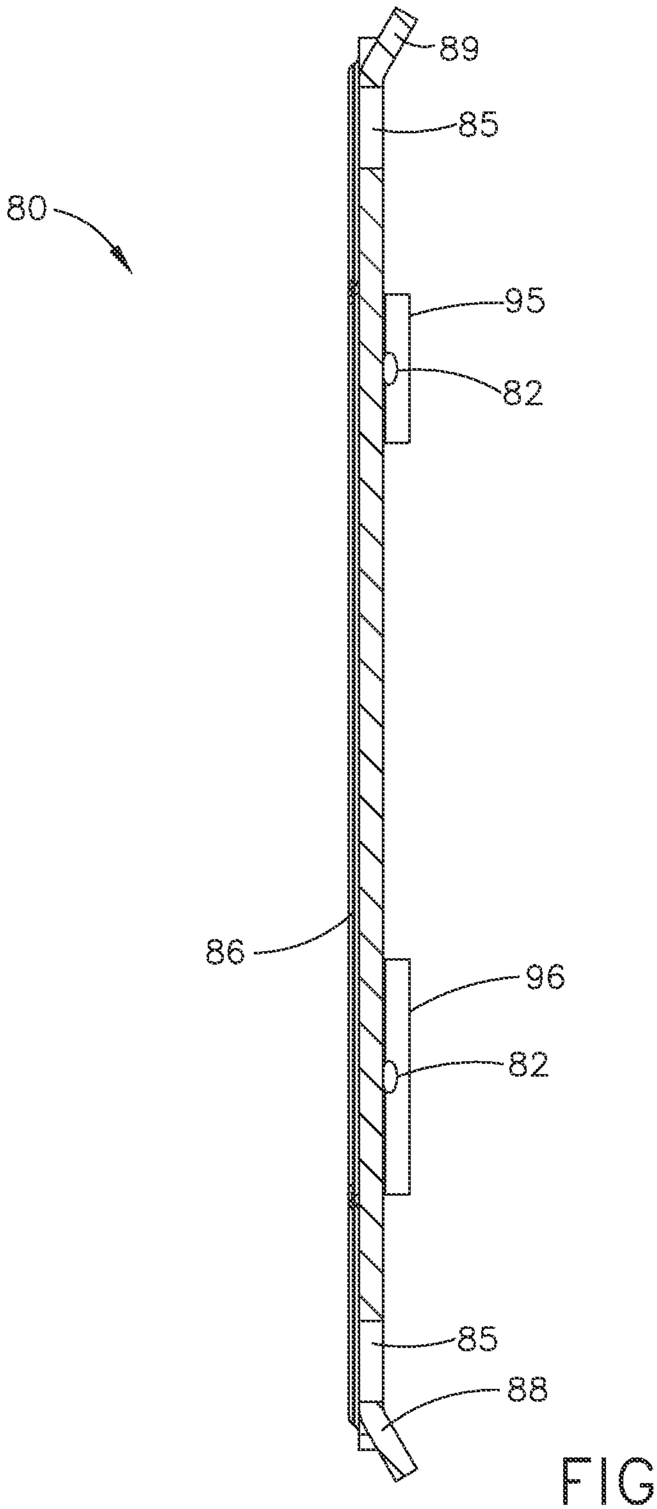
FIG. 5 is a cutaway view of the insert along the line 5-5 of FIG. 3.

Referring now to FIG. 5, the insert 80 is shown in a cutaway view along the line 5-5 of FIG. 3. The inclined tabs 88, 89, 95, 96 are shown projecting at an inclined angle with respect to the plane of the insert 80, thus providing a "3D feature" useful for increasing attack resistance. It should be noted that the insert 80 is constructed of an attack resistant material, and is relatively thin, having a desired thickness of at least 0.0762 cm (0.03 inches), for example. Note the thinner the material, the easier it is to work with, the cheaper it is to make, and the lower the weight of the final product.

Figure 6:
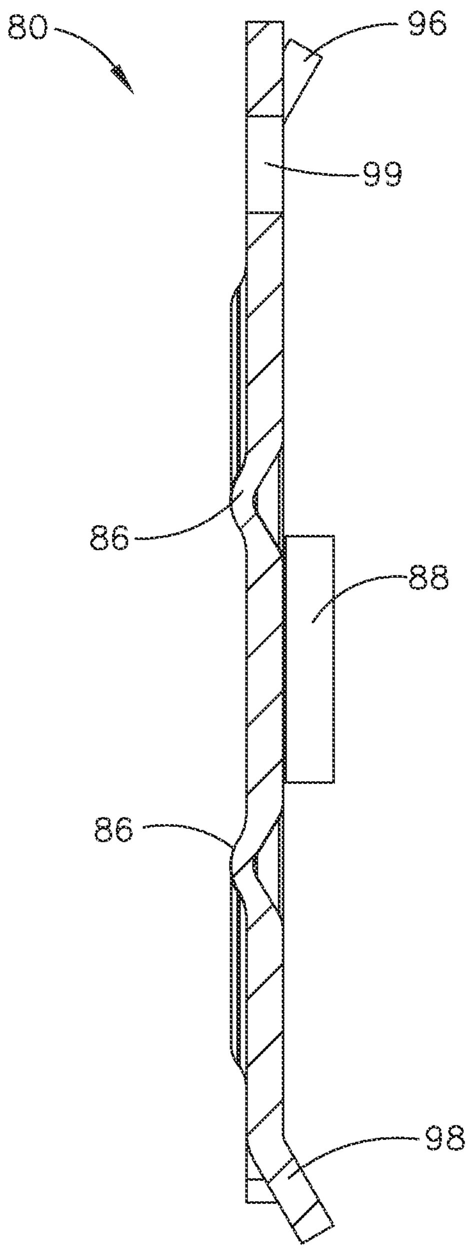
FIG. 6 is a cutaway view of the insert along the line 6-6 of FIG. 3.

Referring now to FIG. 6, the insert 80 is shown in a cutaway view along the line 6-6 of FIG. 3. Again, the inclined tabs 88, 96, 98 are depicted projecting at an inclined angle with respect to the plane of the insert 80, providing a desired "3D feature." The insert 80 preferably has a hardness of Rockwell "C" between 52-58, for example, in order to resist drilling attacks.

Figure 7:
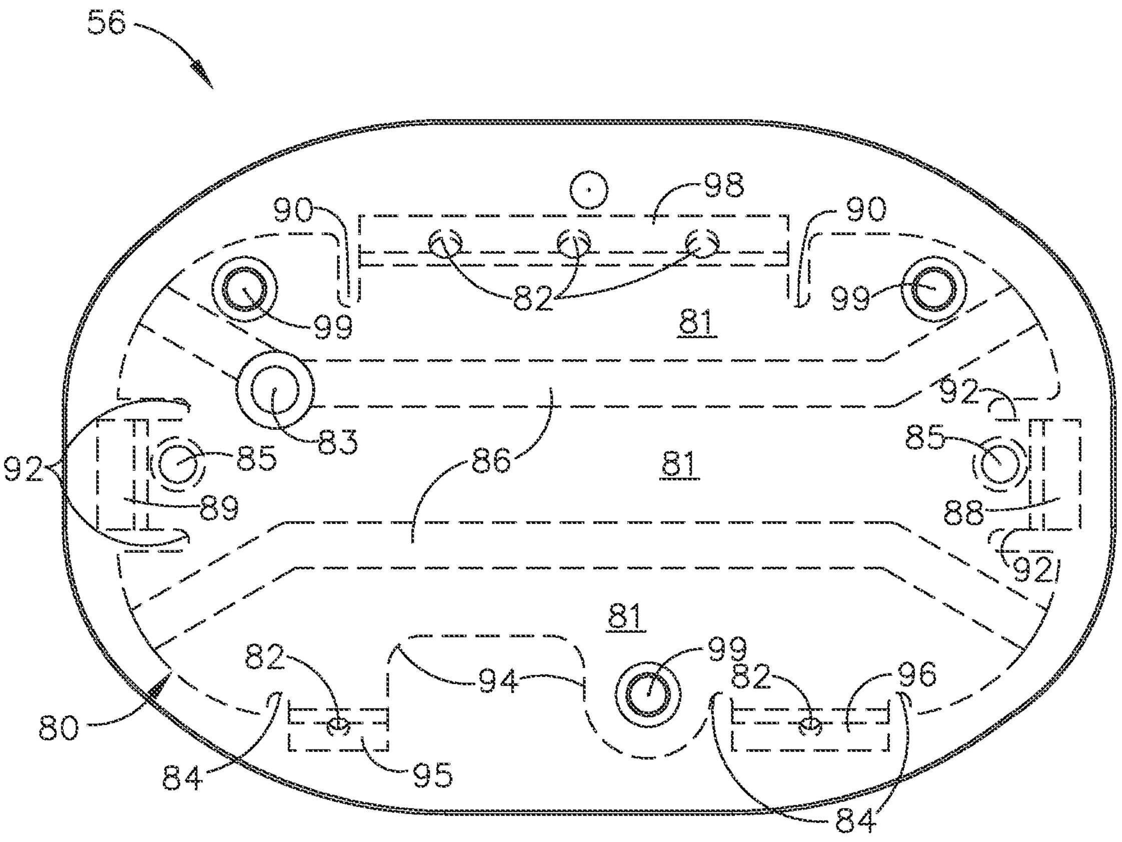
FIG. 7 is a bottom view of a key bin of FIG. 2, showing the embedded insert in dashed lines.

Referring now to FIG. 7, a bottom view of the base 56 showing the embedded insert 80 in dashed lines is illustrated. It should be noted that the insert 80 does not completely "cover" the base 56; however, the insert 80 is large enough to better protect the base 56 from attacks to open the lockbox 10.

The insert 80 is preferably constructed from SK5 steel or an equivalent high carbon steel, for example. Steel is strong enough to increase the resistance to hammering, chiseling, and drilling attacks on the base 56 of the lockbox 10. The bottom half of the key bin 41 is preferably constructed from A360 aluminum, for example, although there are many variants of die casting alloys that can also be used.

The casing 52 is preferably constructed of 304L stainless steel, for example. The casing 52 is formed through a drawing process utilizing multiple draws. Not only does this process provide a single-piece durable housing, but can also provide a variety of casing shapes. Due to this drawing process, the casing 52 exhibits increased resistance to prying attacks. The casing 52 preferably has a hardness of Rockwell "C" between 38-42, for example.

Figure 8:
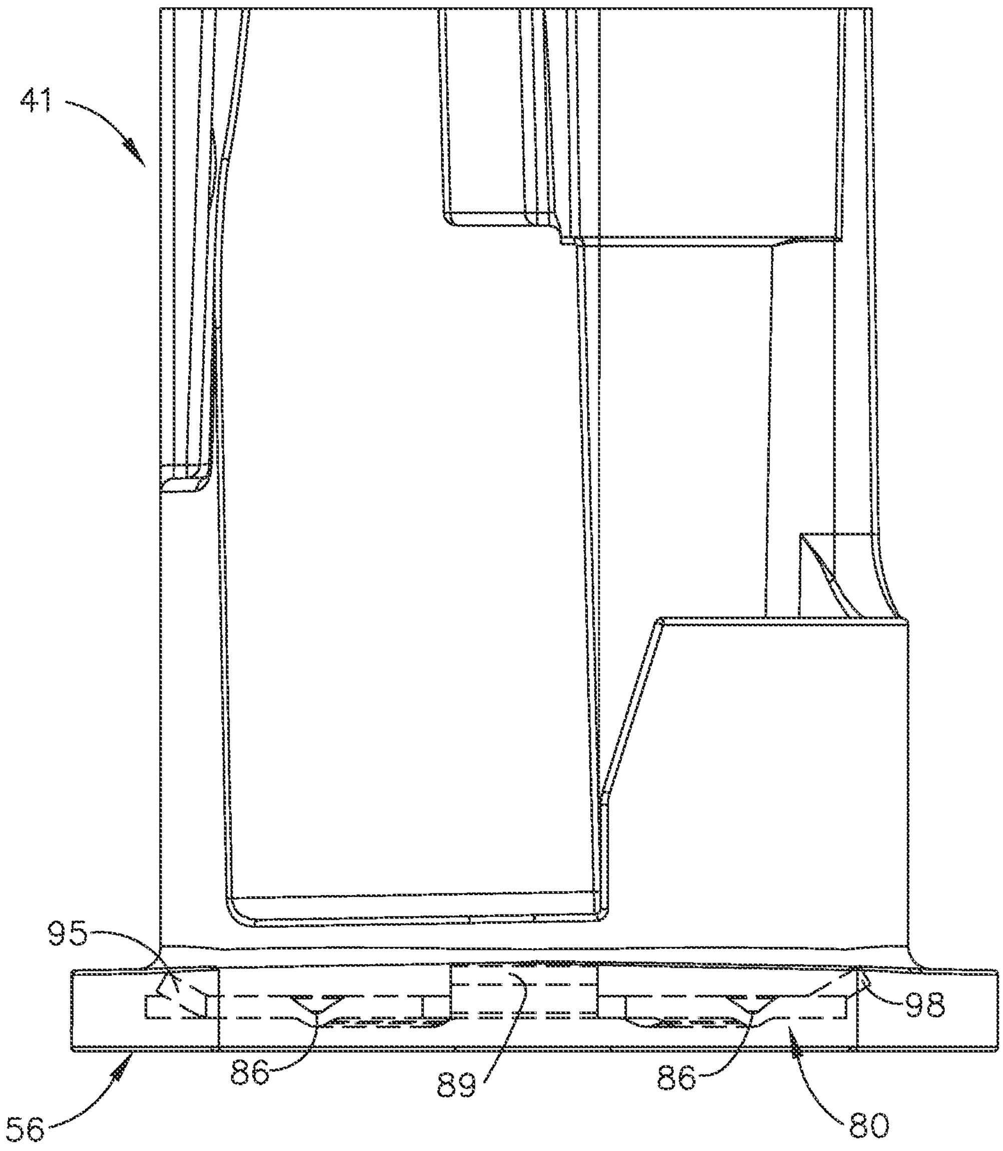
FIG. 8 is an enlarged side view of the bottom half of the key bin of FIG. 2, showing the embedded insert in dashed lines.

Referring now to FIG. 8, the bottom half of the key bin 41 is illustrated in a side view with the embedded insert 80 shown in dashed lines. The inclined tabs 89, 95, 98 are shown projecting at an "upward" angle (in this view). Note that the ridges 86 project outwardly toward the base 56. The ridges 86 provide structural support to the insert 80, making it tougher and stronger. It should also be noted how "thin" the insert 80 is, in proportion to the base 56. However, due to the material that the insert 80 is constructed with (preferably steel, as mentioned above), the "thin" insert is strong and durable, and provides the base 56 with increased resistance to attack.

Figure 9:
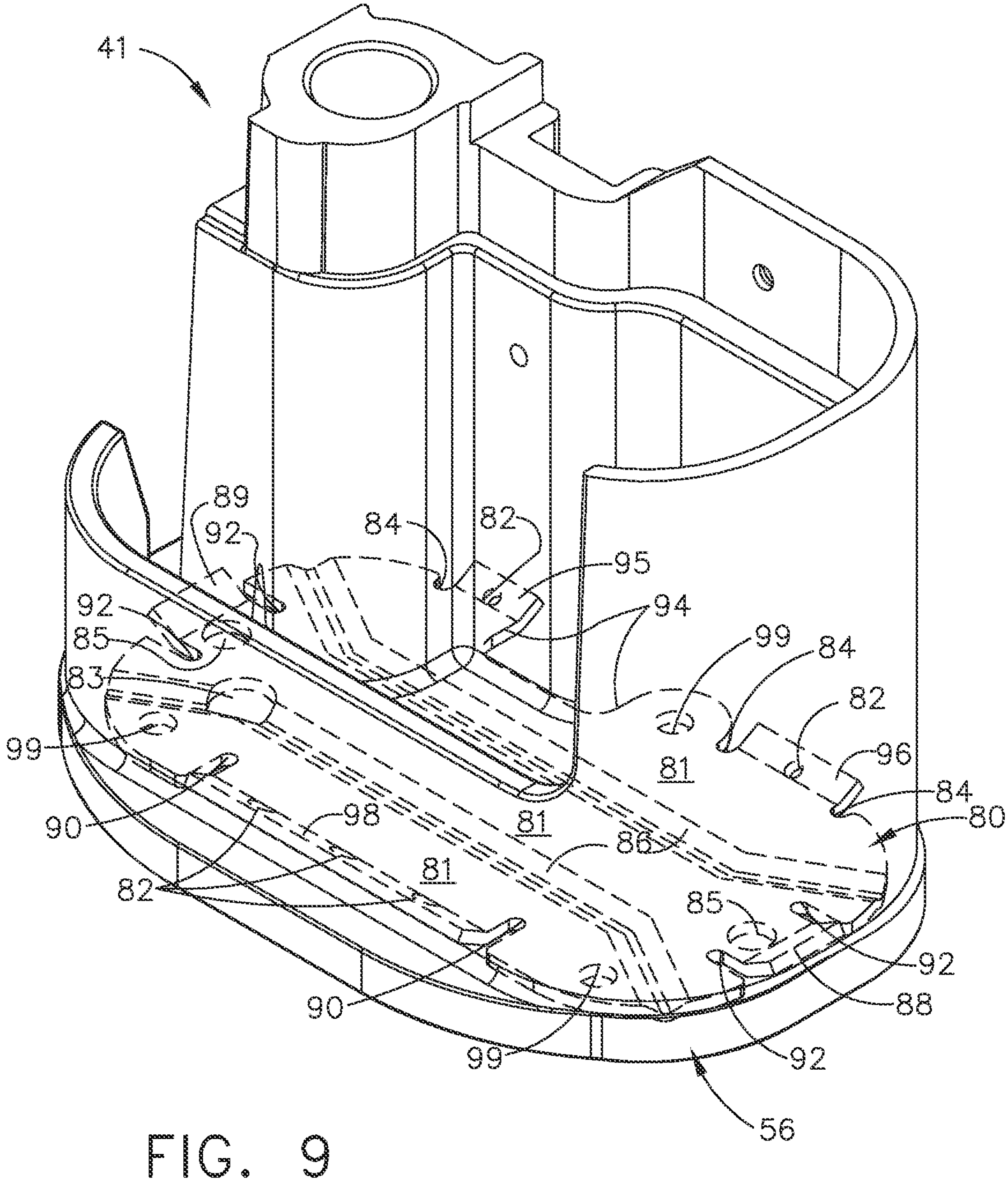
FIG. 9 is a front, top-down perspective view of the key bin of FIG. 8, showing the embedded insert in dashed lines.

Referring now to FIG. 9, the bottom half of the key bin 41 is shown in a front, top-down perspective view with the insert 80 in dashed lines embedded in the floor portion 56. The inclined tabs 88, 98, 95, 96, 98 project "upwards" into the floor 56. These inclined tabs help prevent the insert 80 from simply being "ripped" out of the base 56, in the event that the bottom of the key bin 40 is somehow compromised. The insert 80 is not simply "sandwiched" between the upper and lower layers of the base 56; instead, the insert is embedded into the base in a "3D" manner for a more durable, resistant final construct. The inclined tabs 88, 89, 95, 96, 98 are embedded "deeper" into the key bin alloy material, so that the insert 80 is quite secure. For example, if the insert were a strictly flat planar design and if the base 56 was cracked open, the insert might tend to fall out. However, by providing the inclined tabs 88, 89, 95, 96, 98, the insert 80 is incapable of simply "falling out;" it would have to be cut out of the key bin 40.

Figure 10:
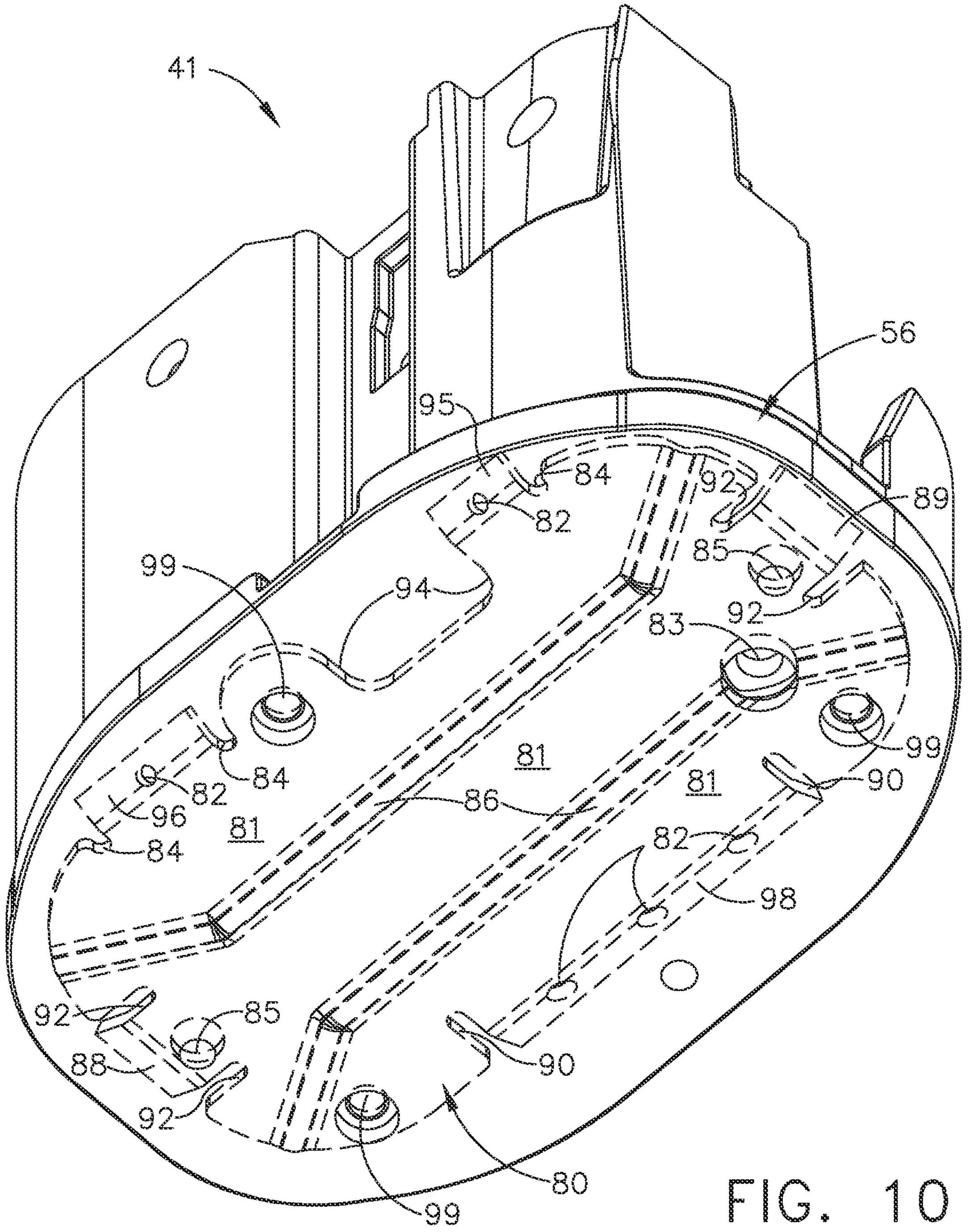
FIG. 10 is a rear, bottom-up perspective view of the key bin of FIG. 8, showing the embedded insert in dashed lines.

Referring now to FIG. 10, the bottom half of the key bin 41 is shown in a rear, bottom-up perspective view with the insert 80 in dashed lines embedded in the wall 56. The ridges 86 are shown, which provide additional structural strength to the insert 80. Note that the insert 80 does not cover the entire base 56; however, the insert does cover a majority of the base. A small open area around the periphery of the insert is helpful for securely casting the key bin while simultaneously securely embedding the insert in the base 56.

Figure 11:
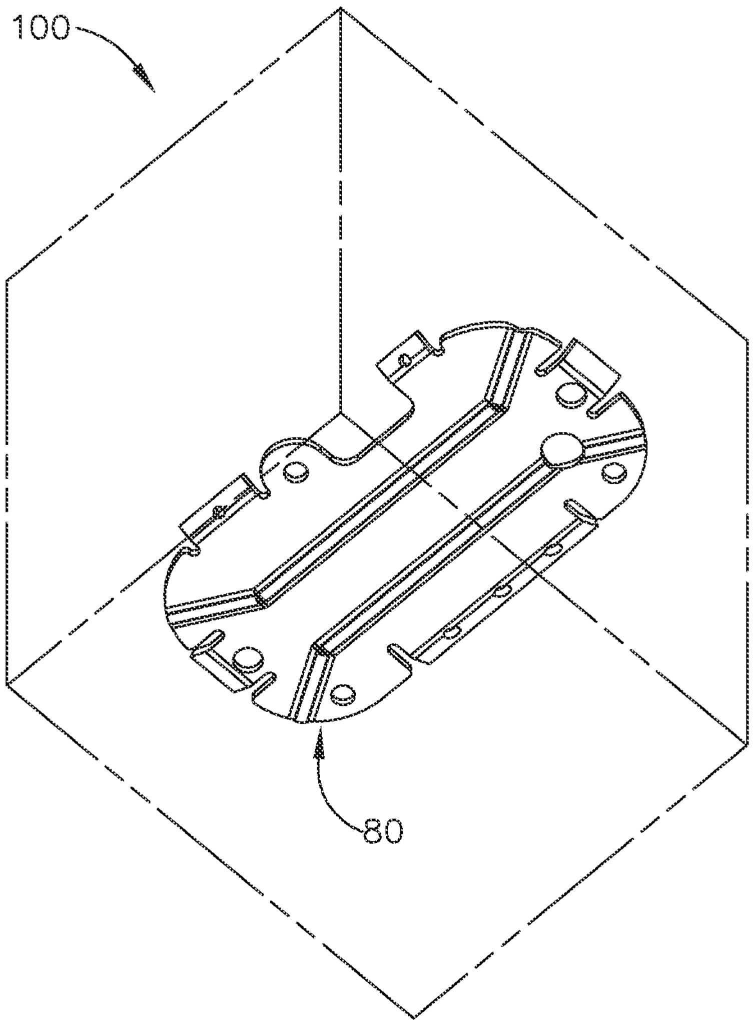
FIG. 11 is a rear, bottom-up perspective view of a casting block used to cast the key bin of FIG. 8, showing the relative position of the insert of FIG. 3 before the casting procedure takes place.

Referring now to FIG. 11, a casting block 100 is shown with the insert 80. The insert 80 is secured in the casting block 100 by three locating pins 106 (as shown in FIG. 12), and then the die casting process is initiated to embed the insert into the key bin.

Figure 12:
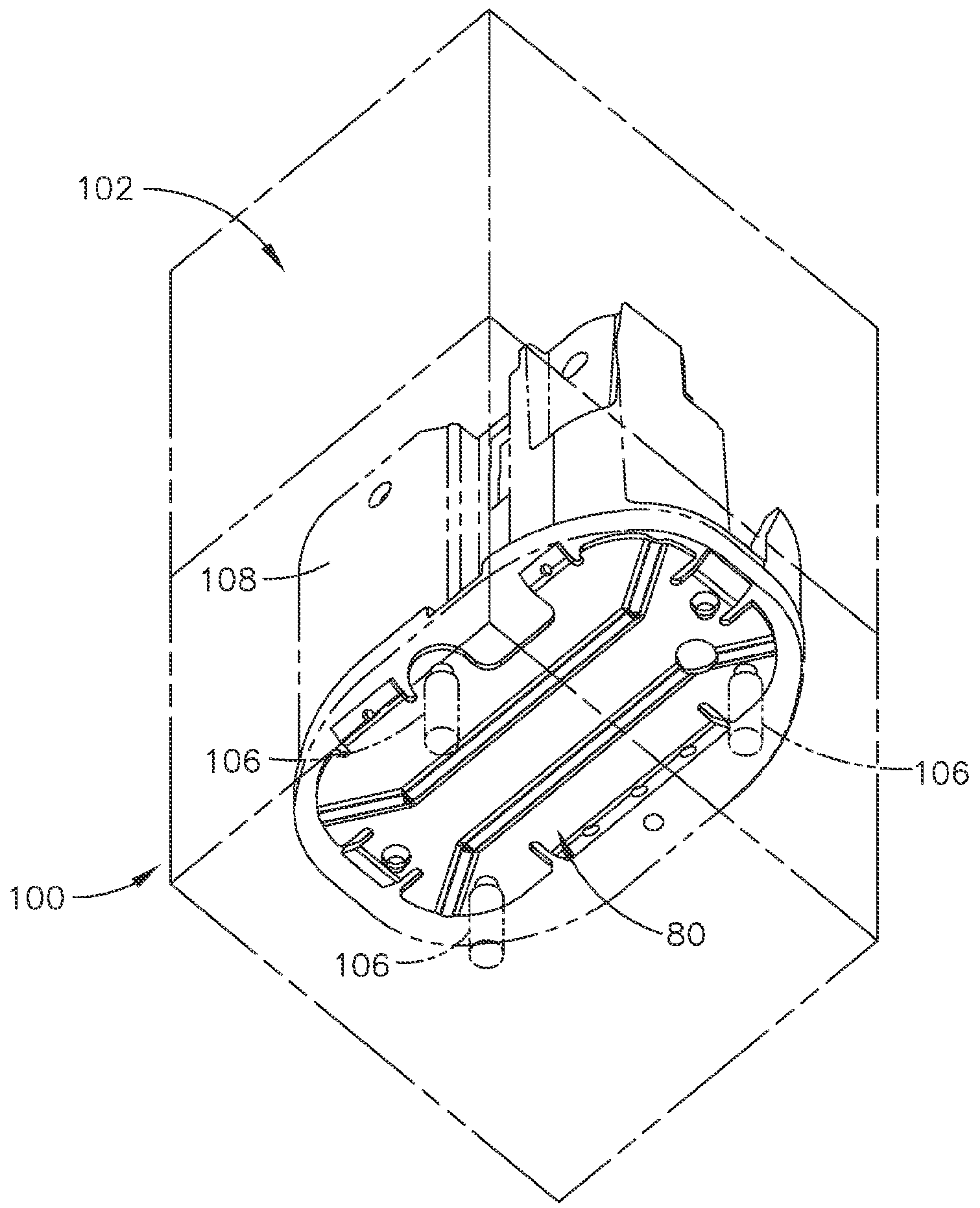
FIG. 12 is a rear, bottom-up perspective view of a casting block and a cavity block for the key bin of FIG. 8, showing the insert held in place by locating pins.

Referring now to FIG. 12, the casting block 100 is shown with a cavity block 102. The insert 80 is held in place using the plurality of locating pins 106. The insert 80 is aligned on the plurality of locating pins 106 by using the plurality of through-holes 99. The cavity block 102 exhibits a cavity mold 108 that defines the final shape of the bottom half of the key bin 41. It should be noted that the "holes" 90 for mounting with the locating pins 106 do not necessarily need to be "through-holes." Instead, the type of structure for receiving the locating pins could merely be indentations or depressions that are sized and shaped to 'mate' to the tips of the locating pins 106.

To cast the key bin, the casting block 100, having secured the insert 80 inside with the plurality of locating pins 106, is temporarily mated to the cavity block 102. A molten die casting material (comprising A360 aluminum, for example) is then poured into the casting block 100 and the cavity block 102. The molten material surrounds and engulfs the insert 80, by passing through the small holes 82, the individual hole 83, and the through-holes 85, and also through the small slots 84, large slots 90, and large slots 92. These particular "3D features" in the insert 80 provide structural integrity for the final product during this casting process. The other "3D feature," the inclined tabs 88, 89, 95, 96, 98, help securely embed the insert 80 into the base 56 as the die cast material begins to cool, and those tabs also provide further structural integrity.

If aluminum alloy is used, its casting temperature is around 1100-1200 degrees Fahrenheit, for example, with a die temperature around 650 degrees Fahrenheit, for example. The specific heat of SK5 steel, if chosen as the material for the insert 80, is sufficient that the heat transfer from the casting material does not reach the 'complete' annealing temperature, because it does not "sit" there long enough (i.e., the "3D features" help the material flow during casting) for the grain structure of the steel to significantly change.

Figure 13:
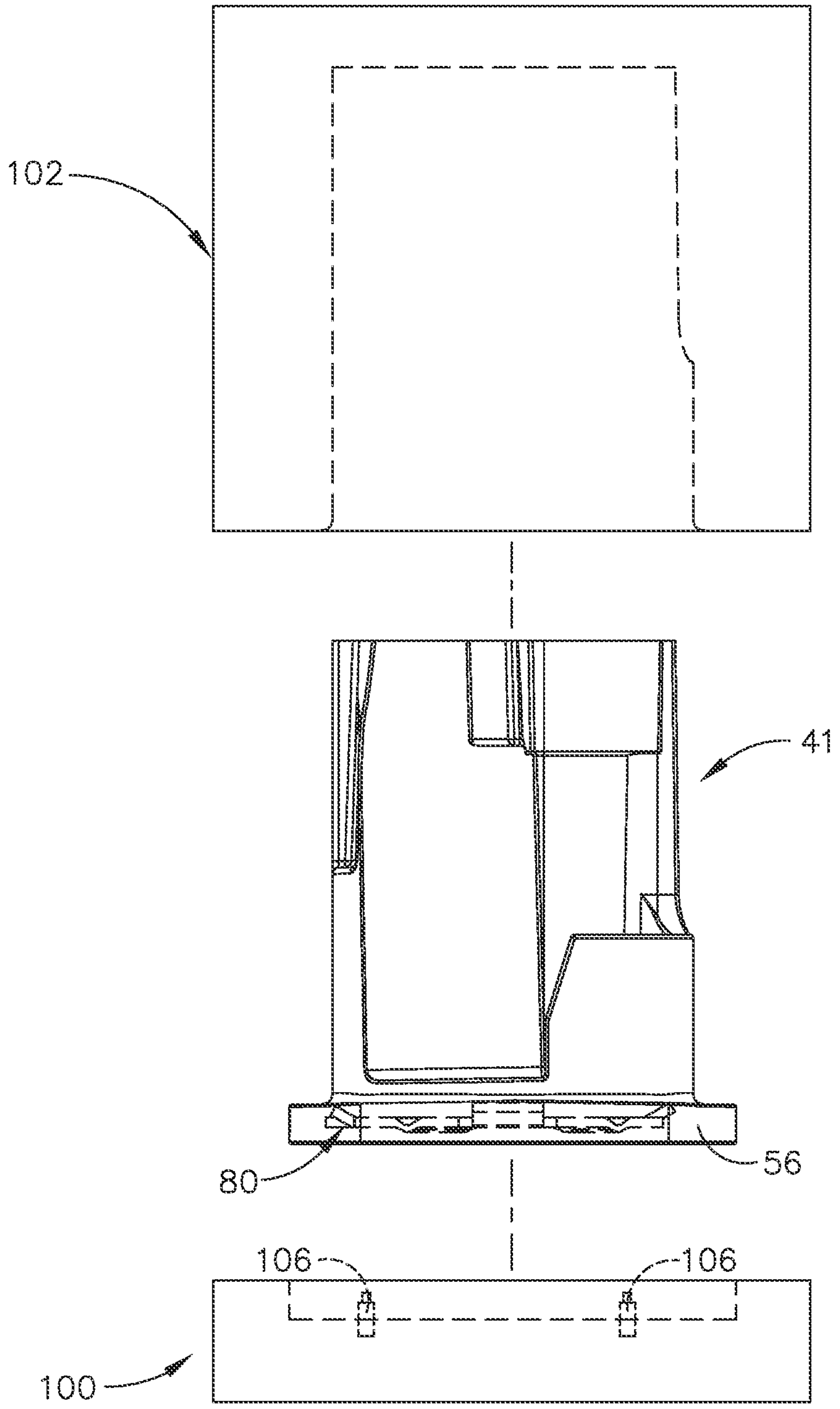
FIG. 13 is a side view of the casting block and the cavity block for the key bin of FIG. 8, showing the finished casting with the embedded insert in dashed lines.

Referring now to FIG. 13, the casting block 100 and cavity block 102 are shown separated along with a fully cast key bin bottom half 41 exhibiting the embedded insert 80 in dashed lines. Note that the plurality of locating pins 106 remain in the casting block 100 after the die halves have separated and the die casting process is completed.

Figure 14:
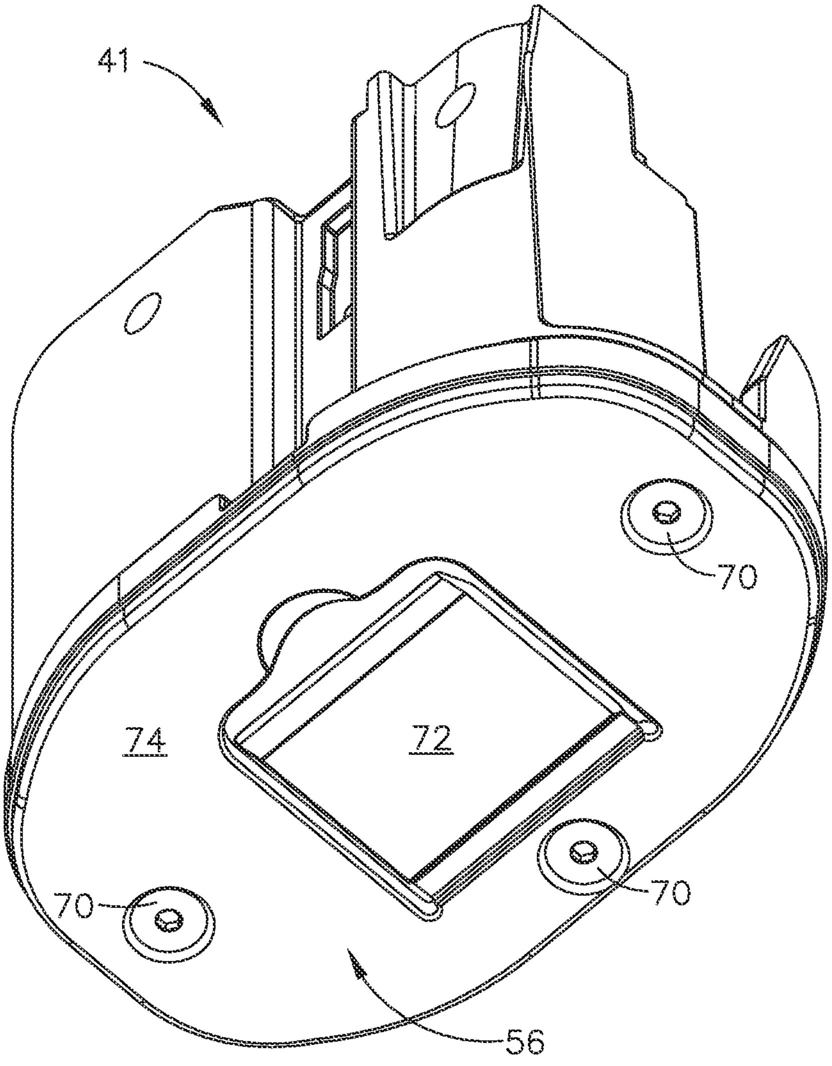
FIG. 14 is a rear, bottom-up perspective view of the key bin of FIG. 8 also showing the ornamental bottom cover.

Referring now to FIG. 14, the bottom half of the key bin 41 is illustrated in a rear, bottom-up perspective view. The base 56 exhibits a plastic cover 74 to protect the metal. This plastic cover 74 has a flap 72, and the flap can be pulled open to reveal a QR code, for example, and/or used to pull the key bin 40 out of the lockbox 10. The plastic cover 74 is secured to the base 56 using a plurality of fasteners or screws 70. It should be noted that the fasteners 70 along the transverse edges secure into the through-holes 85.

Figure 15:
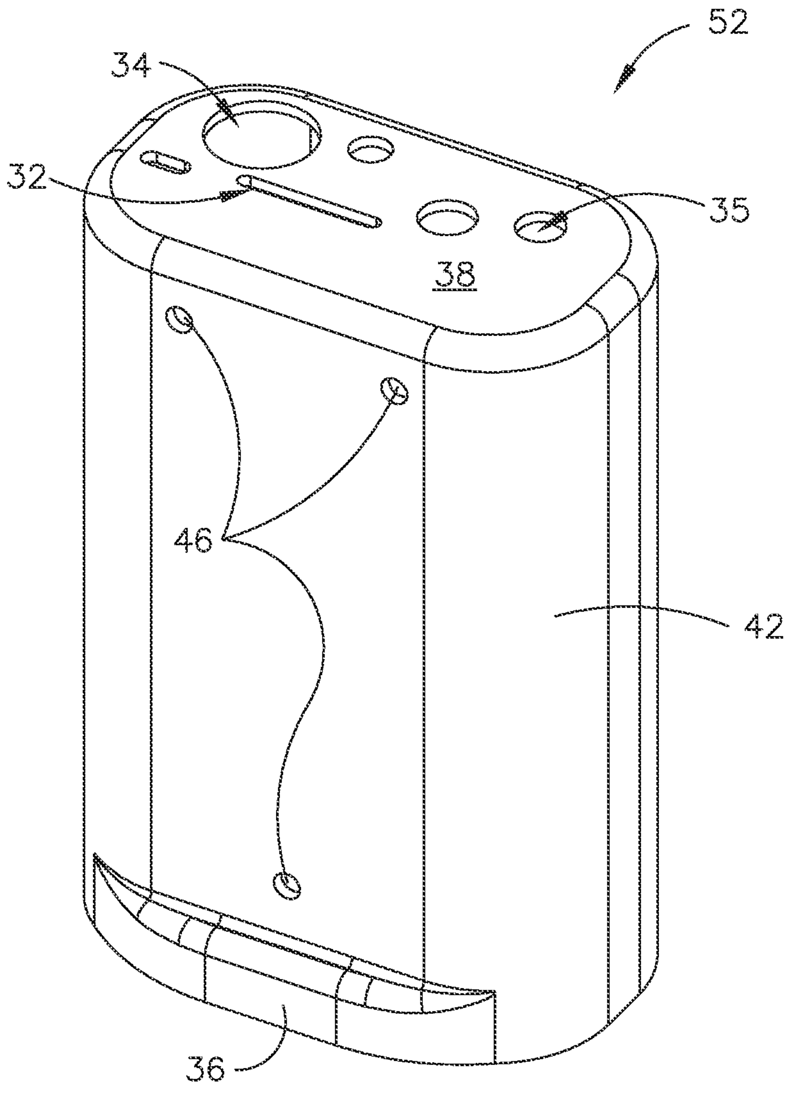
FIG. 15 is a front, top-down perspective view of the housing of the lockbox of FIG. 1.

Referring now to FIG. 15, the "main" lockbox housing 52 is illustrated in a front, top-down perspective view. Its elongated side wall front portion 42 exhibits three openings 46 along its front side, a flared portion 36 proximal to the base, and extends to a top wall 38. The keypad 58 is mounted to the housing via fasteners (not shown) placed at the openings 46, and a ribbon cable (not shown) is fed through a ribbon cable slot 32 in the top wall 38, so that the ribbon cable can be plugged into an internally mounted motherboard. The top wall 38 exhibits a large opening 34 for the shackle extension 66, and a small opening 35 for the shackle extension 68.

Figure 16:
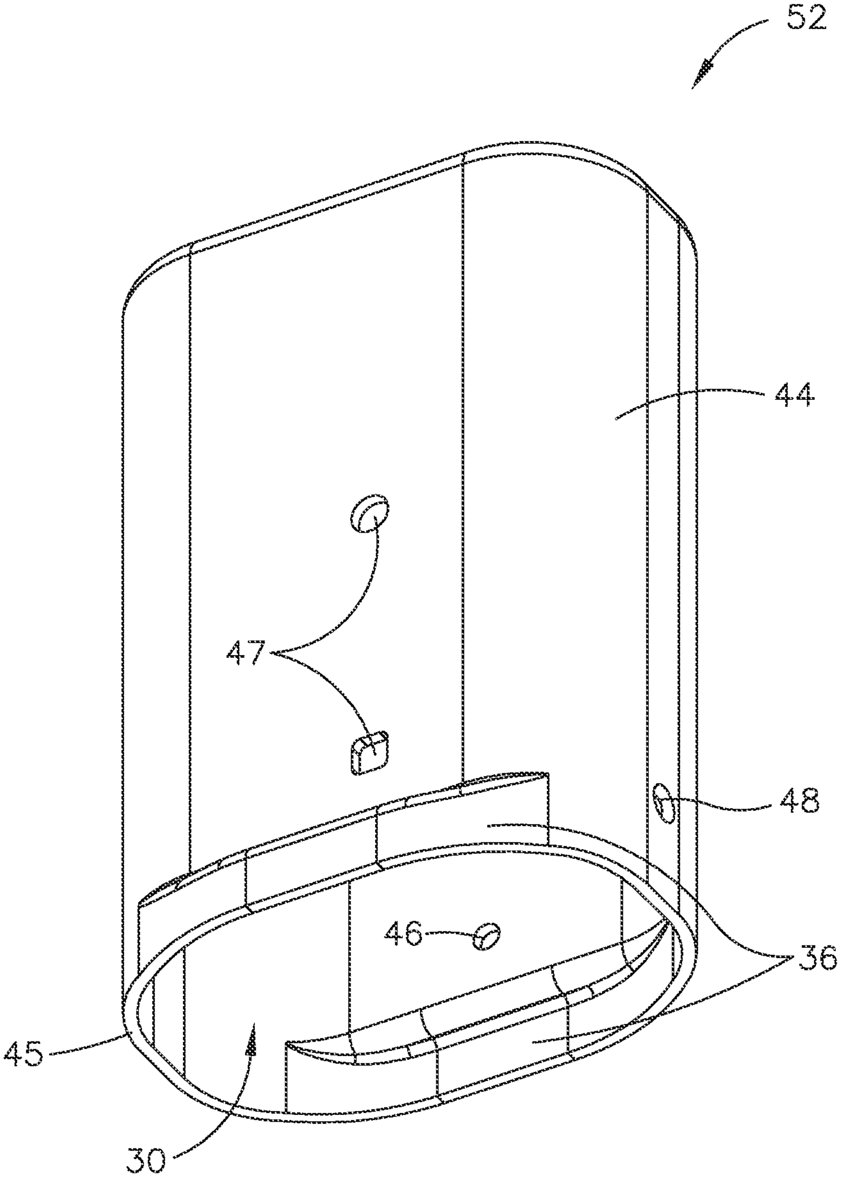
FIG. 16 is a rear, bottom-up perspective view of the housing of the lockbox of FIG. 1.

Referring now to FIG. 16, the housing 52 is illustrated in a rear, bottom-up perspective view. The rear housing portion 44 of the side wall exhibits two openings 47, a side opening 48, and a similar flared portion 36. Note that the rear housing portion 44 and the front housing portion 42 both exhibit flared portions 36. The base of the housing 52 has a perimeter 45, and a bottom open area 30. This bottom open area 30 is for receiving the key bin 40 when it is removably inserted into the housing 52.

It will be understood that the "main" lockbox housing 52 is designed to exhibit a sufficient hardness and structural strength so as to comprise a major "intruder-defeating" element for the overall lockbox 10. Part of this strength and hardness is due to the metal material that is used to create the housing 52. Moreover, additional strength and hardness is provided by the staged drawing process that "stretches" the housing during its manufacture, as described above. The reality of manufacturing costs does not permit this important structural element to literally be invulnerable, and instead, it is designed to be sufficiently difficult to break or cut open that a potential thief will be significantly slowed down in the attempt to drill or cut into the overall lockbox. The bottom wall (or floor) portion 56 of the key bin 40 is similarly designed to meet those criminal-defeating objectives.

It will also be understood that the location, shape, and number of slots and openings of the metal insert 80 can be varied without departing from the principles of technology disclosed herein. For example, the insert could be of a symmetrical design. As another example, the through-holes 82, 83, 85 are used to allow the molten metal to flow during the casting process; however, for a different shaped insert the through-holes may need to be moved, resized, or have more or fewer through-holes. Furthermore, the sizes and shapes of the inclined tabs certainly could be somewhat altered, as well as the rather elongated ridges 86; some or all of those tabs and ridges could perhaps be eliminated, although the overall utility of the embedded insert 80 might be comprised to some extent.

Some additional information about "basic" lockbox embodiments, including advanced features, are more fully described in earlier patent documents by some of the same inventors, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. Pat. No. 7,999,656, issued Aug. 16, 2011, for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. Pat. No. 8,451,088, issued May 28, 2013, for ELECTRONIC LOCK BOX WITH TRANSPONDER BASED COMMUNICATIONS; U.S. Pat. No. 8,164,419, issued Apr. 24, 2012, for ELECTRONIC LOCK BOX WITH TIME-RELATED DATA ENCRYPTION BASED ON USER-SELECTED PIN; U.S. Pat. No. 8,151,608, issued Apr. 10, 2012, for ELECTRONIC LOCK BOX WITH MECHANISM IMMOBILIZER FEATURES; U.S. Pat. No. 9,208,466, issued on Nov. 18, 2015, for ELECTRONIC LOCK BOX SYSTEM WITH INCENTIVIZED FEEDBACK; U.S. Pat. No. 8,593,252, issued Nov. 26, 2013, for ELECTRONIC LOCK BOX PROXIMITY ACCESS CONTROL; U.S. Pat. No. 8,912,884, issued Dec. 16, 2014, for ELECTRONIC KEY LOCKOUT CONTROL IN LOCKBOX SYSTEM; U.S. Pat. No. 9,053,629, issued on May 20, 2015, for CONTEXTUAL DATA DELIVERY TO MOBILE USERS RESPONSIVE TO ACCESS OF AN ELECTRONIC LOCKBOX; U.S. Pat. No. 9,478,083, issued on Oct. 5, 2016, for ELECTRONIC KEY LOCKOUT CONTROL IN LOCKBOX SYSTEM; U.S. Pat. No. 9,704, 315, issued on Jun. 21, 2017, for CONTEXTUAL DATA DELIVERY TO OTHER USERS AT AN ELECTRONIC LOCKBOX; U.S. Pat. No. 10,068,399, issued on Aug. 21, 2018, for CONTEXTUAL DATA DELIVERY TO OTHER USERS AT AN ELECTRONIC LOCKBOX; U.S. Pat. No. 10,026,250, issued on Jun. 27, 2018, for CONTEXTUAL DATA DELIVERY TO USERS AT A LOCKED PROPERTY; and U.S. Patent Application No. 2020-0308870 A1, published on Oct. 1, 2020, for ELECTRONIC LOCKBOX. These patent documents are incorporated by reference herein, in their entirety.

All documents cited in the Background and in the Detailed Description are, in relevant part, incorporated herein by reference; the citation of any document is not to be construed as an admission that it is prior art with respect to the technology disclosed herein.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal" Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An electronic lockbox comprising:

(a) a housing that covers an electronically-controlled lock; and (b) a closable secure container that includes a base portion;

wherein:

(i) said base portion including a steel plate that is embedded during a die casting process that forms said secure container, said steel plate exhibiting a material thickness of at least 0.0762 cm (0.03 inches), wherein said steel plate includes at least one opening configured to allow a molten metal alloy to flow through said at least one opening during said die casting process; and (ii) said secure container is lockable if inserted into said housing, and said secure container is at least partially removable if unlocked.

2. The lockbox of claim 1, wherein:

said steel plate is heat treated before being embedded.

3. The lockbox of claim 1, wherein, said secure container comprises one of: an aluminum-based alloy, and a zinc-based alloy.

4. The lockbox of claim 1, wherein:

(a) said housing comprises a steel alloy; and (b) said housing is constructed by a drawing process, using multiple drawing stages.

5. The lockbox of claim 1, wherein:

(b) said opening is positioned proximal to a perimeter of the steel plate.

6. The lockbox of claim 1, wherein:

(a) said steel plate includes at least one inclined tab proximal to a perimeter of said steel plate, and said at least one inclined tab includes said at least one opening; and (c) a material of said at least one inclined tab is partially annealed in only a localized manner during said die casting process.

7. The lockbox of claim 1, wherein:

(a) said steel plate is substantially planar with a perimeter, said steel plate exhibiting at least one inclined tab proximal to said perimeter, said steel plate exhibiting a plurality of openings, said steel plate exhibiting at least one ridge or channel running along its surface; said steel plate exhibiting at least one slot proximal to said perimeter; and (c) said steel plate is embedded in a wall portion of said secure container during said die casting process.

8. An electronic lockbox comprising:

(a) a housing that covers an electronically-controlled lock; and (b) a closable secure container including a base portion;

wherein:

(i) said base portion including a steel plate that is embedded during a die casting process that forms said secure container and said steel plate includes at least one inclined tab proximal to a perimeter of said steel plate, said inclined tab is partially annealed in only a localized manner during said die casting process, said steel plate being hardened by heat treatment, and said steel plate exhibiting a material hardness of between 52 and 58 on the Rockwell "C" scale; and (ii) said secure container is lockable if inserted into said housing, and said secure container is at least partially removable if unlocked.

9. The lockbox of claim 8, wherein:

(a) said housing comprising of low carbon nickel stainless steel; and (b) said housing exhibiting a material hardness between 38 and 42 on the Rockwell "C" scale.

10. The lockbox of claim 8, wherein, said secure container comprises one of: an aluminum-based alloy, and a zinc-based alloy.

11. The lockbox of claim 8, wherein:

(b) said steel plate includes at least one opening proximal to the perimeter of the steel plate, such that molten metal alloy flows through said at least one opening during said die casting process.

12. The lockbox of claim 8, wherein:

said at least one inclined tab includes at least one opening.

13. The lockbox of claim 8, wherein:

(a) said steel plate is substantially planar with the perimeter, said steel plate exhibiting at least one inclined tab proximal to said perimeter, said steel plate exhibiting a plurality of openings, said steel plate exhibiting at least one ridge or channel running along its surface; said steel plate exhibiting at least one slot proximal to said perimeter; and (b) said steel plate is embedded in a wall portion of said secure container during said die casting process.

14. A housing for an electronic lockbox, said housing comprising:

(a) an outer housing constructed of a solid material including an open bottom portion;

(b) a releasable secure container, said secure container being lockable if positioned inside said housing, and being releasable when unlocked; and (c) said secure container exhibiting a base portion which includes an insert, wherein said insert is embedded during a die casting process and said insert includes a plurality of openings, said insert substantially planar with a perimeter, said insert exhibiting at least one inclined tab proximal to said perimeter; said insert exhibiting at least one slot proximal to said perimeter; and said insert is embedded in a wall portion of said secure container during said die casting process.

15. The housing of claim 14, wherein: said outer housing is constructed of 304L stainless steel.

16. The housing of claim 14, wherein: said secure container is constructed of A360 aluminum alloy.

17. The housing of claim 14, wherein: said insert is constructed of SK5 steel, or an equivalent high carbon steel.

18. The housing of claim 14, wherein, to form said secure container: said insert is mounted in a mold cavity, then molten A360 aluminum is forced into the mold cavity and around said insert, thus embedding said insert in said base portion of the secure container.

19. The housing of claim 14, wherein, during the die casting process:

(a) a temperature of a molten A360 aluminum is in a range of 1100-1200 degrees Fahrenheit; and (b) a temperature of a mold cavity is around 650 degrees Fahrenheit.

20. The housing of claim 14, wherein:

said insert exhibiting at least one ridge or channel running along its surface.

* * * * *